US012301692B2

(12) United States Patent
Brown et al.

(10) Patent No.: US 12,301,692 B2
(45) Date of Patent: *May 13, 2025

(54) PACKET PROCESSING OF STREAMING CONTENT IN A COMMUNICATIONS NETWORK

(71) Applicant: Sandpiper CDN, LLC, Wilmington, DE (US)

(72) Inventors: Timothy Brown, Moseley, VA (US); Veronica Kravchenko, Dublin (IE)

(73) Assignee: Sandpiper CDN, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,373

(22) Filed: Feb. 15, 2024

(65) Prior Publication Data

US 2024/0187499 A1    Jun. 6, 2024

Related U.S. Application Data

(63) Continuation of application No. 18/126,593, filed on Mar. 27, 2023, now Pat. No. 11,909,844, which is a
(Continued)

(51) Int. Cl.
*H04L 12/70* (2013.01)
*H04L 41/0806* (2022.01)
(Continued)

(52) U.S. Cl.
CPC ........ *H04L 67/5682* (2022.05); *H04L 49/252* (2013.01); *H04L 49/9005* (2013.01);
(Continued)

(58) Field of Classification Search
CPC ............... H04L 67/5682; H04L 49/252; H04L 49/9005; H04L 49/9026; H04L 49/9036;
(Continued)

(56) References Cited

U.S. PATENT DOCUMENTS

| 7,991,905 B1 | 8/2011 | Roussos |
| 8,861,520 B1 | 10/2014 | Signaoff |

(Continued)

OTHER PUBLICATIONS

International Search Report and Written Opinion of the International Searching Authority, dated Nov. 2, 2021, Int'l Appl. No. PCT/US21/044777, Int'l Filing Date Aug. 5, 2021; 13 pgs.

*Primary Examiner* — Moustafa M Meky
*Assistant Examiner* — Elizabeth Kassa
(74) *Attorney, Agent, or Firm* — C. Tumey Law Group PLLC

(57) ABSTRACT

Aspects of present disclosure include devices within a transmission path of streamed content forwarding received data packets of the stream to the next device or "hop" in the path prior to buffering the data packet at the device. In this method, typical buffering of the data stream may therefore occur at the destination device for presentation at a consuming device, while the devices along the transmission path may transmit a received packet before buffering. Further, devices along the path may also buffer the content stream after forwarding to fill subsequent requests for dropped data packets of the content stream. Also, in response to receiving the request for the content stream, a device may first transmit a portion of the contents of the gateway buffer to the requesting device to fill a respective buffer at the receiving device.

7 Claims, 6 Drawing Sheets

Related U.S. Application Data continuation of application No. 17/395,205, filed on Aug. 5, 2021, now Pat. No. 11,616,858.

(60) Provisional application No. 63/062,256, filed on Aug. 6, 2020.

(51) Int. Cl.

| | | |
|---|---|---|
| *H04L 49/25* | (2022.01) | |
| *H04L 49/90* | (2022.01) | |
| *H04L 49/9005* | (2022.01) | |
| *H04L 49/9057* | (2022.01) | |
| *H04L 65/75* | (2022.01) | |
| *H04L 67/12* | (2022.01) | |
| *H04L 67/568* | (2022.01) | |
| *H04L 67/5681* | (2022.01) | |
| *H04L 67/5682* | (2022.01) | |
| *H04N 21/2225* | (2011.01) | |
| *H04N 21/231* | (2011.01) | |
| *H04N 21/232* | (2011.01) | |
| *H04N 21/44* | (2011.01) | |
| *H04W 48/08* | (2009.01) | |

(52) U.S. Cl.
CPC ...... *H04L 49/9026* (2013.01); *H04L 49/9036* (2013.01); *H04L 49/9057* (2013.01); *H04L 65/765* (2022.05); *H04L 67/568* (2022.05); *H04L 67/5681* (2022.05); *H04N 21/2225* (2013.01); *H04N 21/23106* (2013.01); *H04N 21/232* (2013.01); *H04N 21/44004* (2013.01)

(58) Field of Classification Search
CPC . H04L 49/9057; H04L 65/765; H04L 67/568; H04L 67/5681; H04L 65/612; H04N 21/2225; H04N 21/23106; H04N 21/232; H04N 21/44004; H04N 21/6375
USPC .......................................................... 709/231
See application file for complete search history.

(56) References Cited

U.S. PATENT DOCUMENTS

| | | | |
|---|---|---|---|
| 9,348,880 B1* | 5/2016 | Kramer | G06F 16/248 |
| 2012/0209814 A1* | 8/2012 | Zhang | G06F 11/1458 |
| | | | 707/654 |
| 2013/0198313 A1 | 8/2013 | Hayton | |
| 2013/0265876 A1* | 10/2013 | Song | H04L 47/10 |
| | | | 370/235 |
| 2013/0322847 A1* | 12/2013 | Anderson | H04N 21/47217 |
| | | | 386/E9.011 |
| 2014/0006478 A1* | 1/2014 | Eguchi | H04L 65/61 |
| | | | 709/203 |
| 2014/0347981 A1 | 11/2014 | Rangne | |
| 2015/0110103 A1* | 4/2015 | Kullangal Sridhara | |
| | | | H04L 65/80 |
| | | | 370/352 |
| 2015/0281125 A1 | 10/2015 | Koponen | |
| 2016/0099988 A1 | 4/2016 | Rusert | |
| 2017/0078436 A1 | 3/2017 | Ishihara | |
| 2020/0044880 A1* | 2/2020 | Sankaran | H04L 41/0816 |
| 2021/0051116 A1* | 2/2021 | Kim | H04L 49/9015 |
| 2022/0045973 A1 | 2/2022 | Brown | |
| 2023/0231932 A1 | 7/2023 | Brown | |

\* cited by examiner

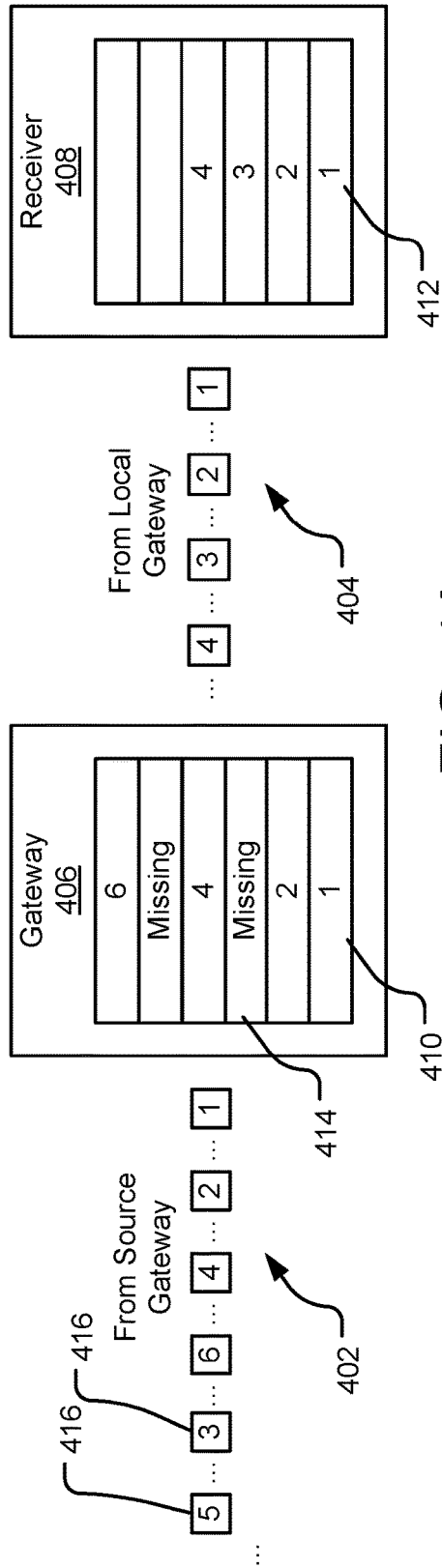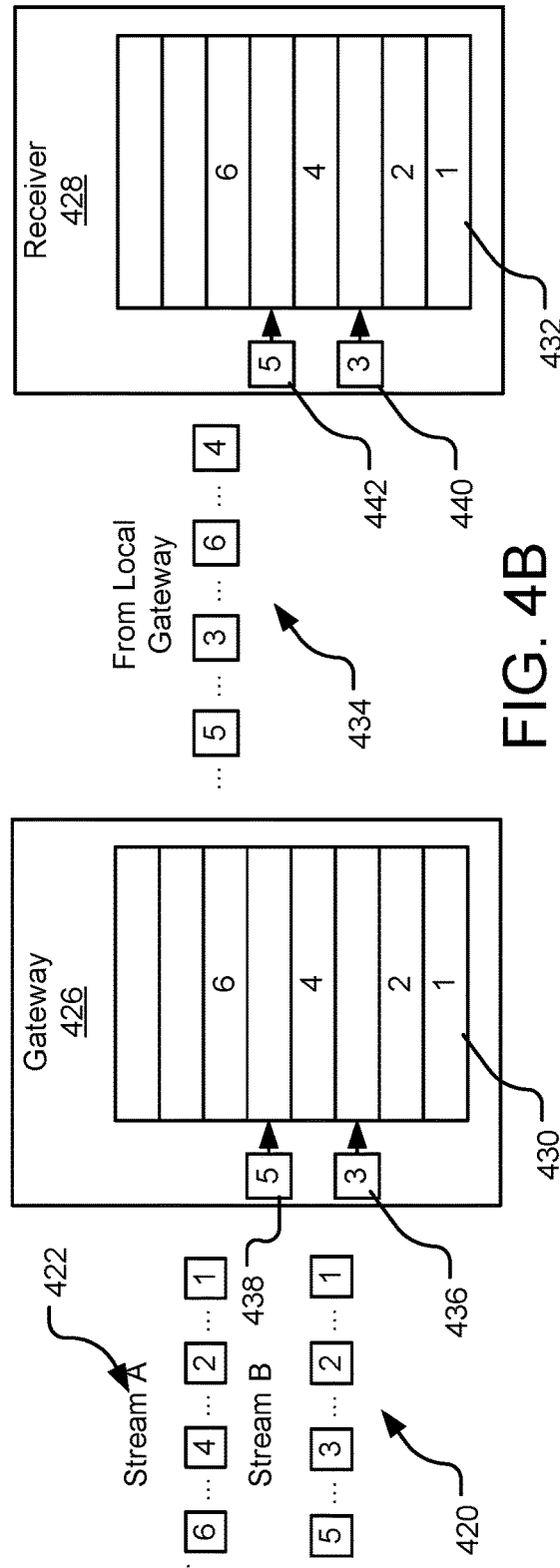

PACKET PROCESSING OF STREAMING CONTENT IN A COMMUNICATIONS NETWORK

TECHNICAL FIELD

Embodiments of the present invention generally relate to apparatus, systems, and methods for implementing a communications network, and more specifically for processing packets of a content stream, such as a stream of packets of a multimedia presentation, to reduce latency of transmission of the packets to a destination device.

BACKGROUND

Providers of content (also known as publishers) use the Internet (or other types of public and private network of interconnected devices) to provide all kinds of content to numerous users throughout the world through any number of platforms. Generally, consumers of provided content utilize a computing device to connect to a network to receive the published content, such as multimedia presentations including movies, music, books, television shows, etc. Upon receipt from the network, the receiving computing device may process the received packets of the streamed content and display or otherwise play the received content. In one particular implementation, content publishers may transmit or stream live content, such as a multimedia presentation of a live event, concerts, sporting events, etc., across the Internet for distribution to subscribers of the streamed content. Streaming of live content over the Internet may replace traditional transmission over satellite systems or communication networks dedicated or reserved for transmission of the particular content. For example, customers have previously subscribed to a cable or satellite provider that would record and broadcast the live event to dedicated devices within the customer's home. The cable or satellite provider would therefore provide the dedicated computing devices to each customer for receiving the live broadcast and charge each customer a premium for the cost of the dedicated device, in addition to a monthly charge for access to the broadcast content.

More recently, content providers have begun broadcasting live events and other streaming content over the Internet, which can be accessed and processed by non-dedicated computing devices, such as smart phones, laptops, smart TVs, and the like. However, the Internet is a public network such that the capacity to transmit streamed content may become unreliable at times. For example, portions of the public network may become overwhelmed or operate slowly at peak hours as the routers and other devices of the network attempt to process multiple requests for content at once. This delay in transmission of packets across the Internet may introduce a lag in the streamed content, causing the content to stall, stop, or skip, reducing the enjoyment of the consumer in watching or consuming the streamed content. In geographic areas in which several options are available to obtain the live, streamed content, providing the content with as little lag as possible may make the content provider the preferred choice among consumers.

It is with these observations in mind, among other, that aspects of the present disclosure were conceived.

SUMMARY

One aspect of the present disclosure relates to a method for processing data packets of a content stream. In one implementation, the method may include the operations of receiving, from a source device, a portion of a content stream comprising an ordered sequence of data packets, comparing, at a network device, a sequence identifier obtained from a received data packet of the ordered sequence of data packets to a storage array comprising sequence identifiers of data packets received at the network device, and forwarding, prior to storing the received data packet in a buffer maintained by the network device and based on the sequence identifier of the received data packet missing from the storage array, the received data packet to a computing device.

Another aspect of the present disclosure relates to a data network. The data network may include a source device comprising a buffer storing an ordered sequence of data packets of a content stream, a first network device to receive a data packet of the ordered sequence of data packets the content stream from the source device and forward, prior to storing the received data packet in a buffer maintained by the first network device, the received data packet to a first receiving device, and a second network device receiving the content stream from the first network device and transmitting the content stream to a second receiving device.

Yet another aspect of the present disclosure relates to a networking device comprising a communication port receiving a data packet of a sequence of data packets comprising a portion of a content stream, one or more processors, and a non-transitory storage device including computer executable instructions. When the computer executable instructions are executed by the one or more processors, the one or more processors may compare a sequence identifier obtained from the received data packet to an array of sequence identifiers associated with the content stream and forward, prior to storing in a buffer and based on the sequence identifier of the received data packet missing from the array, the received data packet to a receiving network device.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

FIG. 4A is a schematic diagram illustrating processing data packets of streamed content at a gateway device and providing the data packets to a receiving device in accordance with one embodiment.

FIG. 4B is a schematic diagram illustrating hitless filling of a content buffer at a gateway device and providing streamed data packets to a receiving device in accordance with another embodiment.

DETAILED DESCRIPTION

Figure 1:
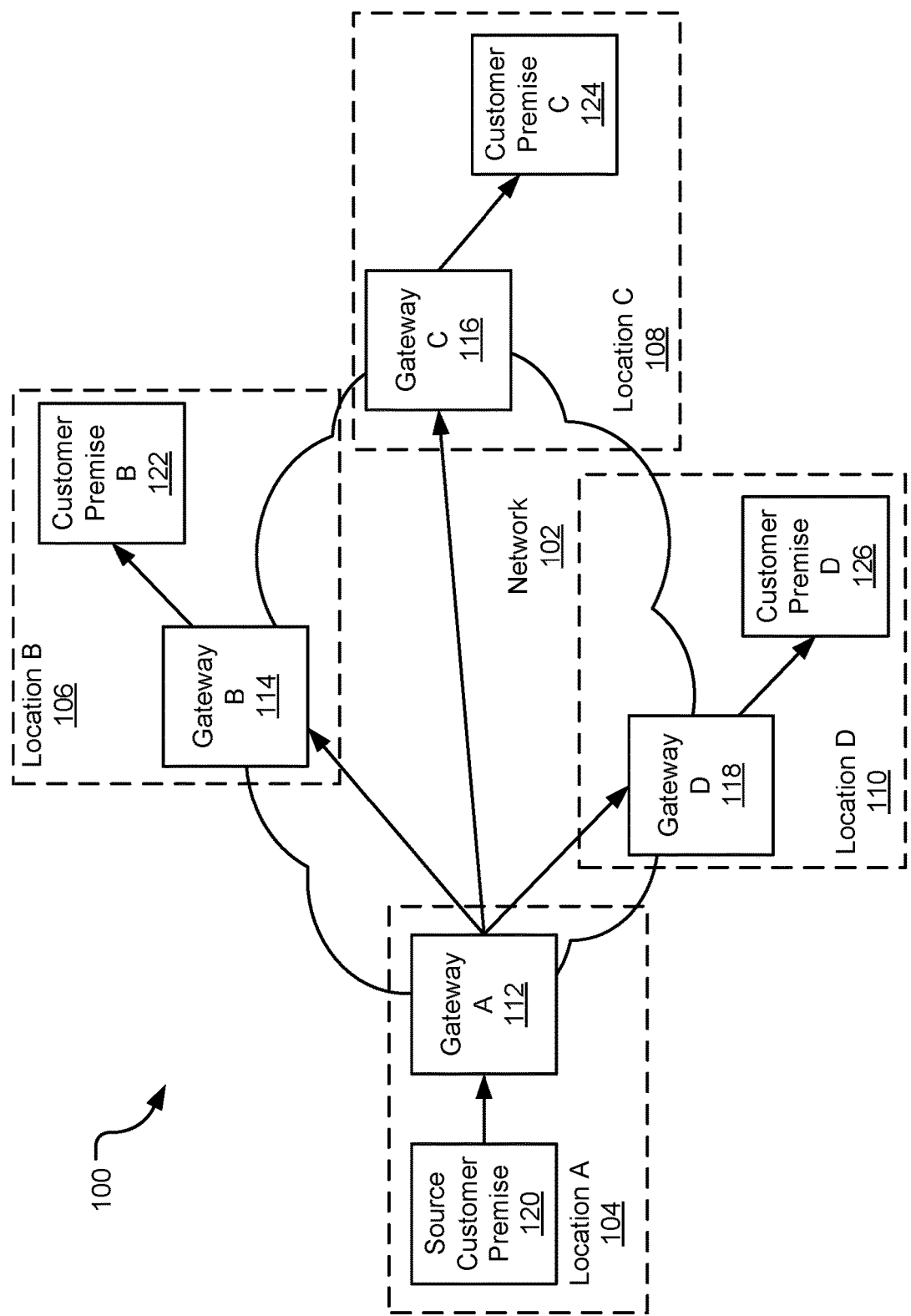
FIG. 1 is a schematic diagram illustrating a first exemplary Internet Protocol (IP) operating environment for streaming content in accordance with one embodiment.

Aspects of the present disclosure involve systems, methods, and the like, for processing packets of a stream of data packets at a networking device to reduce lag in transmitting the data packets across a network. In one implementation, the stream of data packets may include at least a portion of a multimedia presentation, such as a broadcast of a live event and may be referred to herein as a "data stream", a "content stream", "streamed data", "content data", and the like. In some instances, the streamed data may be stored at distributed gateways or other devices of the network and made available to relatively local computing devices upon request. In other instances, the streamed data may include a live broadcast of an event such that the data packets of the multimedia presentation are continually streamed from the recording of the live event to the relatively local computing device presenting the event. In general, however, the systems and methods described herein may be applied to streaming of any data across a network.

Techniques for transmitting streamed content across a network, which may include the public Internet, generally include buffers at hops along the transmission route of the stream to the destination device. The data (or packets) is buffered at each hop along the route to help insure that packets are not lost in transmission and that all of the necessary packets reach the destination. However, each buffer along the route introduces some lag (delay) in the transmission of data packets along the route. For example, the buffer at each hop receives a data packet, stores the data packet in a queue, and then transmits the data packet to the next hop in the route. Each of these actions introduces a lag into the transmission speed of the route, the duration of which may vary depending on several factors of the buffering process, such as size of queue, processing speed of the buffer to store the packet, and the like. As mentioned above, this cumulative lag may slow the delivery of the content to a destination computing device, negatively effecting a customer's experience in consuming the streamed content.

To reduce the amount of lag introduced into a streaming route through a network and in accordance with the systems and methods described herein, one or more devices within a transmission path of streamed content may forward received data packets of the stream to the next device or "hop" in the path prior to buffering the data packet at the device. In this method, typical buffering of the data stream may therefore occur at the destination device for presentation to a consuming device or user, while the devices along the transmission path may transmit a received packet before buffering. By forwarding received data packets prior to buffering at one or more of the devices on the streamed content transmission path, the data packets may be received at the destination device with less lag than in a system that buffers at each hop. Further, in one embodiment, to help ensure that all necessary packets for presentation of the streamed content are received at the destination device, a hop computing device may receive multiple data streams of the same content and perform a hitless fill procedure in the respective buffer to recover any data packets that may have been lost along the transmission route. In this manner, the streamed content may be provided to a consuming device (which may buffer the received content stream packets) while reducing the amount of time used to transmit each data packet along the data stream transmission path to the destination device.

Although the data packets may be forwarded to the next hop or device in the content stream transmission path prior to buffering, one or more network devices along the path may also buffer the content stream to fill subsequent requests for dropped data packets of the content stream and/or request to begin receiving the content stream. In one example, a network device may request the content stream from a network gateway device or other device along the transmission path. The gateway may, in response to receiving the request for the content stream, first transmit at least a portion of the contents of the gateway buffer to the requesting device to fill a respective buffer at the receiving device. In some instances, the size and/or contents of the transmitted portion of the gateway buffer may be based on an available bandwidth of a connection between the gateway and the requesting device. The requesting device may fill a respective buffer at the requesting device with the received portion, thereby filling the buffer at the requesting device at a faster rate than compared to receiving the data stream one packet at a time from the gateway. Upon filling the buffer with the received portion, the requesting device may then begin receive single data packets of the content stream from the gateway and process the data packets accordingly (such as inserting the received data packet into the buffer of the receiving device) to provide the content stream to a consuming device further along the streaming transmission route. By initially providing a portion of the contents from the gateway buffer, the receiving device may fill its respective buffer faster and begin providing the content stream at a faster rate in comparison to waiting until enough data packets are received to fill the buffer at the receiving device.

FIG. 1 illustrates an exemplary operating environment 100 for providing streaming services in one or more networks, including a public communications network 102, which may support portions of or otherwise be considered the Internet. In general, the environment 100 provides for streaming content from a source device to one or more destination devices. In one example, the environment 100 may be utilized to stream live content (e.g., televised content) or other audio-visual or multimedia content, such as a broadcast of a sporting event, concert, news event, and the like. In some instances, the public network 102 may include portions or be supported by a wholesale network service provider. However, while the environment 100 of FIG. 1 shows a configuration using the public network 102, it should be appreciated that portions of the network may be configured as a private network and may include non IP-based routing. For example, network 102 may include devices utilizing time division multiplexing (TDM) or plain old telephone service (POTS) switching. In general, the network 102 of FIG. 1 may include any communication network devices known or hereafter developed.

The public network 102 includes numerous components such as, but not limited to gateways, routers, switches, route reflectors, and registrars, which enable transmission of communications and/or provides services across the network 102 to devices of or connected to the network, but are not shown or described in detail here because those skilled in the art will readily understand these components. Devices, components, customers, etc. may connect to the public network 102 through one or more interface devices along the edge of the network 102. Interface devices may generally provide ingress/egress points for interacting with the network 102 and may include, but are not limited to, gateway device A 112, gateway device B 114, gateway device C 116, and gateway device D 118, although other edge devices may also be utilized in the network 102. In some instances, such as that illustrated in FIG. 1, the gateway devices 112-118 may each be located in a separate geographical area for transmission of the content stream to devices located in or near those locations. In particular, gateway A 112 may connect to the network 102 in a first geographic location 104 (such as New York City), gateway B 114 may connect to the network 102 in a second geographic location 106 (such as Chicago), gateway C 116 may connect to the network 102 in a third geographic location 108 (such as Los Angeles), and gateway D 118 may connect to the network 102 in a fourth geographic location 110 (such as Houston). It should be appreciated that the geographic areas 104-110 may include more than one edge device or gateway and the geographic areas may be relatively diverse or near the other geographic areas. The references to specific geographic areas are used here merely for the purposes of explanation, and not intended to limit the techniques to any specific geographic area or arrangement.

In the implementation illustrated in FIG. 1, streaming content is transmitted from a source device 120 to several destination devices 122-126 via public network 102. In particular, a source customer premise device 120 in location A 104 may transmit or otherwise provide the streaming content to gateway A 112 associated with the public network 102. In some instances, the streamed content may include data packets for a multimedia presentation of a live event, such as video data packets, audio data packets, and the like. The data packets of the streamed content may include, in some instances and in addition to content data, identification information, such as an identification of the content being streamed and/or a sequence identifier that indicates the particular packets position within a sequence of data packets that form the streamed content. The use of the sequence identifier of the streamed content is discussed in more detail below. A receiving computing device may process the streamed content in an order based on the sequence identifier included in each packet to present the multimedia presentation included in the data portion of the content packets.

The source device 120 may receive the content stream from a content provider and may, in some instances, be associated with the content provider. For example, the content provider may include a customer premise site at one or more locations, such as location A through location D 104-110. Each customer premise site 120-126 may include customer premise equipment for transmitting and/or receiving streamed content for the content provider to a customer of the content provider. Thus, in one example, customer equipment may generate the streamed content (such as through capturing audio and video portions of the event via a camera, microphone, etc.) and provide the stream to the source customer premise device 120 for distribution to other customer premise devices via the network 102. The source premise device 120 may buffer the incoming stream and provide the streamed content to gateway A 112 in location A 104 for distribution across the network 102 to a customer premise device 122 at location B 106, a customer premise device 124 at location C, and/or a customer premise device 126 at location D 110. Each receiving device 122-126 may connect to network 102 via a respective gateway device 114-118 in the respective location 106-110 or in another location near the receiving device. The receiving devices 122-126 may buffer, package, and provide the streamed content to one or more consuming devices configured to present or otherwise consume the streamed content. For example, a viewer's computing device may communicate with the receiver device B 122 in location B 106 to obtain and display the streamed content on the viewer's computing device. In general, more than one consuming device may communicate with a receiving device 122-126 to receive the streamed content, such that several consuming devices may be given simultaneous access to content buffered at the customer premise device in a particular location. However, there is typically a one-to-one relationship of receiving premise device 122-126 to location 104-110 such that each receiving device may receive a dedicated stream from the source device 120. In circumstances in which additional receiving devices request a stream from the source device 120 in an already served location, an additional connection to the source device 120 may be established to receive a dedicated stream of data packets.

The environment 100 of FIG. 1 has some drawbacks, however, when providing the streaming content to the receiving devices 122-126. In particular, a new dedicated stream may be established for each new customer premise equipment requesting a stream from the source, thereby requiring a large bandwidth at the source device 120 connection to the network 102 to support each dedicated stream being provided by the source device. In addition, as each customer premise receiving device 122-126 receives a single stream of data packets, failures in one or more portions of the network 102 may slow or halt the stream of data packets to a receiving device such that the broadcast of the streamed content to one or more of the customer premise devices may be interrupted.

Figure 2:
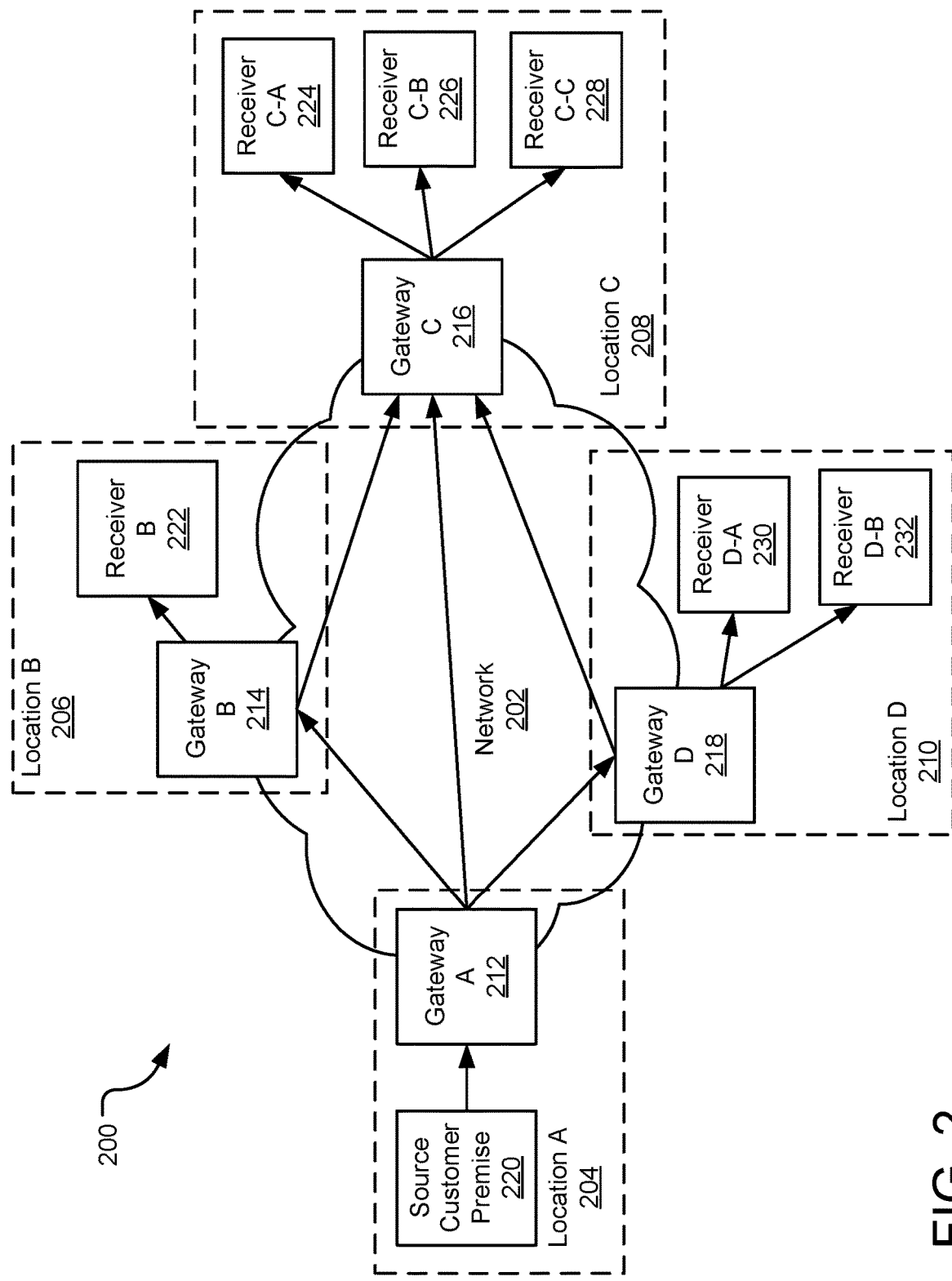
FIG. 2 is a schematic diagram illustrating a second exemplary Internet Protocol (IP) operating environment for streaming content in accordance with one embodiment.

To address one or more of these issues, FIG. 2 illustrates a schematic diagram illustrating a second exemplary Internet Protocol (IP) operating environment 200 for streaming content in accordance with one embodiment. Many of the components or elements of the environment 200 of FIG. 2 are similar to that described above in relation to FIG. 1. For example, the environment 200 may include a public network 202 over which streamed content may be transmitted from a source device 220 to one or more receiving devices 222-232. Gateway devices 212-218 may provide an interface to the network 202 for a source device 220 in location A 204, a receiving device 222 in location B 206, a receiving device 224 in location C 208, and a receiving device 230 in location D. The receiving devices 222-232 of FIG. 2 may be customer premise devices discussed above with relation to FIG. 1 or may be other computing devices configured to receive and process a stream of content from the source device 220. Additionally illustrated in the environment 200 of FIG. 2 are multiple receiving devices in location C 208, namely receiving device C-B 226 and receiving device C-C 228, each receiving a stream of data packets via gateway C 216. Similarly, receiving device D-B 232 may receive a stream of data packets via gateway D 218 in location D 210. Also similar to above, location A 204 may, in one instance, be in New York City, location B 206 may be in Chicago, location C 208 may be in Los Angeles, and location D 210 may be in Houston. Through the environment 200, a stream of data packets containing multimedia content may be provided to the destination or receiving devices 222-232 for dispersal to one or more consuming devices, as described above.

Although the environment 200 of FIG. 2 is similar to that of FIG. 1, the devices within the environment 200 may be configured to improve transmission of the content stream to receiving devices 222-232. In one implementation, the gateway devices 212-218 of the network 202 may buffer received data packets of the content stream for re-transmission to other devices or gateways of the network. In one particular implementation, the gateway devices 214-218 may be configured to broadcast or transmit the content stream to multiple receiving devices connected to the gateway in a particular location. Previously (such as in the example illustrated in FIG. 1), each receiving device would receive a dedicated stream of content packets from the source device such that the source device would need to provide multiple streams of the content to support the various receiving devices. However, by buffering the content at the egress gateway devices 214-218 of the network 202, multiple receiving devices may receive the content stream without the need for a new dedicated stream. For example, gateway C 216 of network 202 may be configured to buffer the received content stream and provide the content stream to receiving devices C-A through C-C 224-228 in location C 208. Similarly, gateway D 218 may buffer the received content stream and provide the content stream to receiving devices D-A and D-B 230, 232 in location D 210. Thus, rather than dedicating a content stream to each receiving device that requests a stream, the system of FIG. 2 may buffer and replicate content streams at the gateway devices 214-218 to serve the content stream to multiple receiving devices at a particular location or otherwise associated with a gateway device.

In another implementation, one or more gateway devices 212-218 of the network 202 may be configured to transmit a received content stream to another gateway device of the network. For example, gateway B 214 and gateway C 218 may be configured to buffer the content stream received from gateway A 212 connected to the source device 220 as discussed above and transmit the buffered content stream to gateway C 216. In general, the gateways 212-218 may be configured to broadcast the content stream to any other gateway or any other device or component of the network 202. In the particular example illustrated in FIG. 2, gateway C 216 receives the content stream from three devices of the network 202, gateway A 212, gateway B 214, and gateway D 218. However, it should be appreciated that gateway C 216 may receive the content stream from more or fewer gateways or devices of the network 202. As explained in more detail below, receiving multiple versions of the content streams may allow a device, such as gateway C 216, to perform a hitless fill of missing data packets of the content stream to further improve the transmission speed for providing the content to a consuming device or receiving device, such as receiver C-A 224. It should be appreciated that each of the gateways 212-218 may be configured to provide the received content stream to each of other gateways or network devices, some of the other gateways or network devices, or none of the other gateways of network devices in the network 202.

To provide the content stream to other gateways or multiple receiving devices, one or more of the devices of the network environment 200 may buffer the data packets of the content stream for rebroadcasting to the devices. For example, gateway B 214 may buffer the data packets of the content stream received from gateway A 212 and utilize the buffer to provide the data packets to receiver B 222. In general, the content buffer of each network device provides a storage of the data packets, often in an order based on the sequence identifier of each packet, for transmission to other devices. In addition, the buffer allows a device receiving the content stream an opportunity to re-request and receive packets that may be dropped or lost in transmission to a receiving device. For example, one or more data packets of the content stream transmitted to gateway B 214 from gateway A 212 may be lost or dropped within the public network 202 due to a failure, a slowdown, a routing error, etc. As mentioned above, each data packet of the content stream may include a sequence identifier that provides the location of the particular packet within the sequence of data packets that make up the content stream. Gateway B 214 may analyze each received data packet to determine the sequence identifier associated with each received packet and store the packet in the buffer according to the location of the received packet in the sequence. For example, a data packet identified as the first data packet of the content stream may be stored in the buffer first, followed by a data packet identified as the second packet of the stream, and so on. In some instances, however, one or more data packets of the content stream may not reach gateway B 214, due to the aforementioned failures within the network 202. In those instances, gateway B 214 may transmit an additional request to gateway A 212 to retransmit a missing data packet based on the sequence identifier of the missing packet. For example, gateway B 214 may determine that the fourth packet in a content stream was not received, but the fifth and sixth packet was received. Gateway B 214 may then transmit a request to gateway A 212 to provide the fourth packet of the content stream. Gateway A 212 may obtain the missing data packet from a buffer maintained at gateway A 212 and provide the requested packet to gateway B 214. Gateway B 214 may then store the received packet in the local buffer according to the data packet's position within the data stream sequence. In this manner, missing data packets may be requested of the transmitting device to fill in the holes in the sequence of data packets of the content stream.

The procedure of identifying missing packets, requesting re-transmission of the missing packet, and processing by the receiving device takes time to complete. Thus, to ensure uninterrupted streaming of the content data packets while a device waits for retransmission of a missing packet, the buffers maintained by the devices along the transmission path may be sufficiently large to ensure that missing packets may be requested from the transmitting devices and received at the requesting device before they are scheduled to be transmitted to the next hop in the content sequence. However, the delays needed to fill the buffers within the devices of the transmission path increase the time utilized to provide a requested content stream to a destination or consuming device as each buffer introduces a lag into the transmission speed. Further, some or all of the devices of the environment 200 of FIG. 2 may maintain some size of a local buffer to aid in broadcasting the content stream to other devices. For example, gateway A 212 may buffer the content stream from the source device 220, gateway B 218 may buffer the content stream from gateway A 212, gateway C 216 may buffer the content stream received from gateway D 218, and receiver C-A 224 may buffer the content stream from gateway C 216. As such, a content stream transmitted from the source device 220 to receiver C-A 224 via gateway D 218 may have significant delays added to the time to provide the content stream to the destination device due to the multiple buffer delays consumed at each hop or device along the transmission path.

Figure 3:
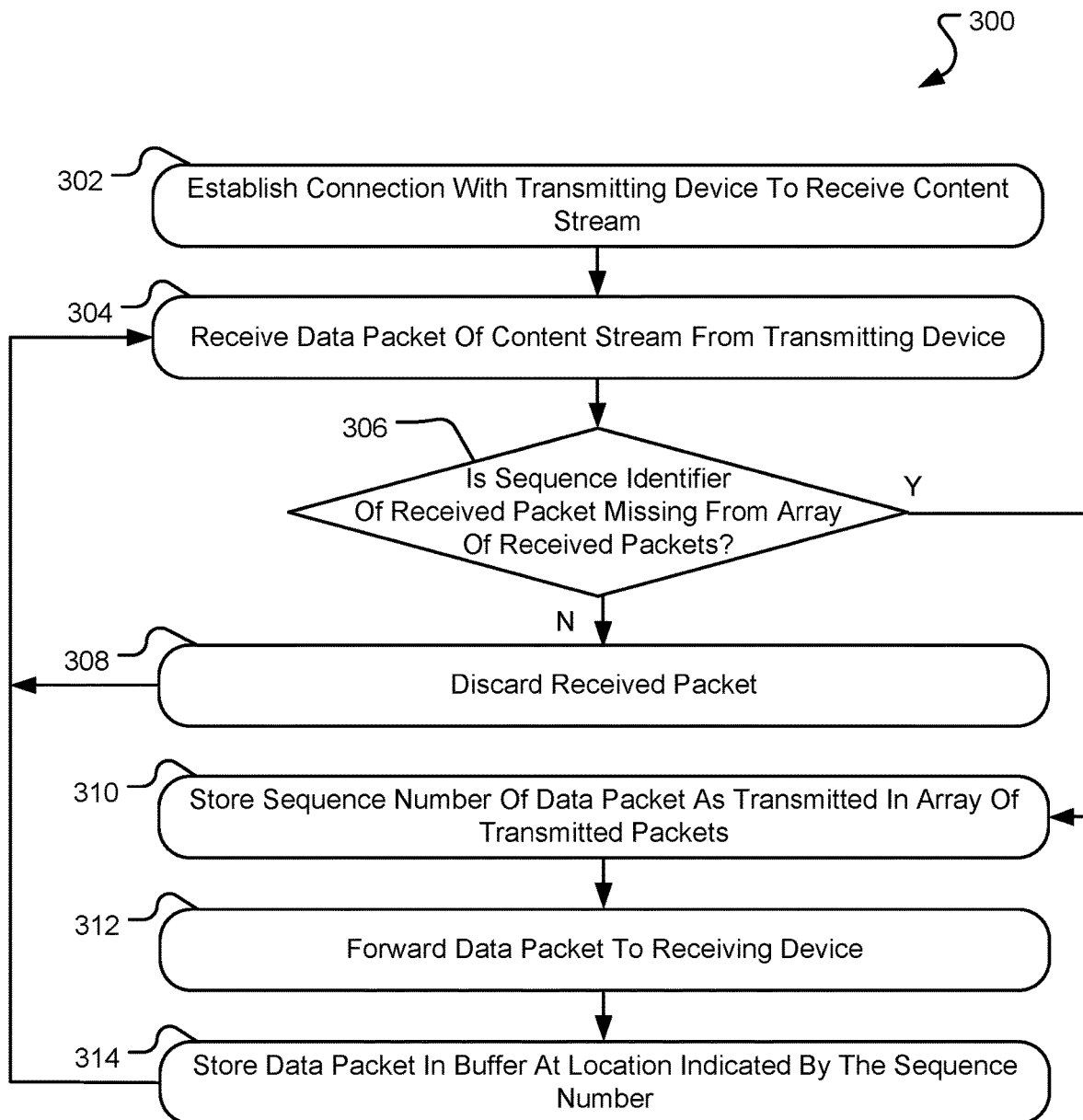
FIG. 3 is a flowchart illustrating a method for processing packets of a data stream in accordance with one embodiment.

To improve the transmission speed of the content stream to the receiving devices 222-232, one or more of the devices within a transmission path of a content stream may perform the method 300 of FIG. 3. In general, the operations of the method 300 may be performed by one or more devices, components, or elements of the public network 202 and/or customer premise equipment, such as the source device 220 and/or the receiving devices 222-232 at the various locations 204-210. The operations of the method 300 may be performed by hardware components, software programs, or a combination of both hardware and software components of the devices and apparatus of the network environment 200. In the example described below, the operations may be performed by gateway C 216 in Los Angeles to provide a content stream to customer premise receivers 224-228 located in location C 208 for distribution to one or more consuming devices. Other devices of the network environment 200 of FIG. 2 may also perform one or more of the operations described.

Beginning in operation 302, the gateway may establish a connection with a transmitting device to begin receiving a content stream, including the sequence of data packets of the content stream. For example, gateway C 216 may establish a connection with gateway A 212, gateway B 214, and/or gateway D 218 to begin receiving the content stream. The established connection may include connecting to network 202 and announcing an address associated with the connected gateway. Data packets of the content stream may include this associated address as a destination address and devices within the network 202 may route the data packets to the destination gateway 216 based on the destination address. In one particular example, the address may be an Internet Protocol (IP) address of the gateway 216 or device reachable via the gateway, although other address types may be used.

In operation 304, the gateway 216 may receive a data packet of a content stream from a transmitting device. In some instances, the gateway 216 may receive multiple content streams from multiple transmitting devices. The data packets of each content stream may include an identifier of the content stream of which the data packet belongs and a sequence identifier that indicates a location for that data packet within the sequence of data packets that comprise the content stream. In still other instances, the gateway 216 may receive streams of data packets from different sources that are a part of the same content stream. For example, gateway C 216 may receive a first version of a content stream from gateway A 212, a second version of the content stream from gateway B 214, and a third version of the content stream from gateway D 218. However, as some packets may be lost or dropped during transmission through the network 202, the content streams may not be identical, even as part of the same broadcast or streamed content.

As mentioned above, the gateway device 216 may include a buffer of received data packets of the content stream such that other devices within the transmission path of the content stream may request missed or dropped data packets. Thus, the gateway device 216 may determine, in operation 306, if the received data packet is missing from the buffer at the gateway device or other array of received data packets indicators. In one instance, the gateway 216 may compare a sequence identifier or number associated with the received data packet to the sequence identifiers of the data packets stored in the buffer to determine if the data packet is present in the buffer. In another implementation, the gateway 216 may maintain an array of data packet identifiers that have been received at the gateway. In general, the array may include the sequence identifier of each received data packet for the content stream and, in some instances, may be ordered based on the sequence identifiers. At the beginning of the content stream, the buffer or array at the gateway device 216 may be empty such that any received data packet may not be missing. However, as the buffer is populated or filled with received data packets, the gateway device 216 may determine that the received data packet is already stored in the buffer (or not missing from the buffer) based on the presence of a data packet in the buffer with the same sequence identifier for the content stream. In circumstances in which the data packet is stored in the buffer, the gateway 216 may discard the received data packet in operation 308 and return to operation 304 when an additional data packet is received from the transmitting device.

FIG. 4A illustrates a block diagram 400 of one example of buffering of data packets at a gateway device as received from a transmitting device. In particular, gateway 406 of FIG. 4A may be similar to the gateway 216 located in Los Angeles (or the various other examples) as discussed. As shown, gateway 406 includes a buffer 410 for temporarily storing data packets of a content stream based on a sequence identifier included with each received data packet. A stream 402 of such data packets may be transmitted from a source gateway device, such as gateway A 212, gateway B 214, or gateway C 218, as described above, with each data packet of the content stream 402 including a sequence identifier (indicated by the number within each box of the data stream 402 of FIG. 4A). In the example shown, the content stream 402 includes data packet 1, data packet 2, data packet 4, and data packet 6 of the sequence of the content stream. Upon receipt at the gateway 406, the received data packets may be stored in the buffer 410 based on the sequence identifier associated with each received data packet. Thus, as shown in FIG. 4A, the buffer 410 of gateway 406 may include an entry for data packet 1, data packet 2, data packet 4, and data packet 6. For any number of reasons, data packet 3 and data packet 5 of the content stream 402 may not be received at the gateway device 406 from the content stream. Rather, such packets may be lost in transmission or significantly delayed such that they arrive out of sequence for the content stream. In the example shown, gateway 406 may order the data packets in the buffer 410 based on the sequence identifiers of the data packets. In this manner, the gateway 406 may identify the missing data packets 414 from the buffer 410 as there will be locations in the buffer that are not filled by a packet, such as data packet 3 and data packet 5 in this example. The gateway 406 may, upon determining that one or more packets are missing, may request the missing data packets, in this case data packet 3 and data packet 5, from the source gateway. The source gateway may then re-transmit the requested data packets 416 in response to the request for the missing data packets in the content stream 402 for inclusion in the buffer 410.

In one instance, the gateway 406 may utilize the buffer 410 to transmit the content stream to a receiving device 408, such as customer premise receiver C-A 224, C-B 226, and/or C-C 228 via content stream 404. To provide the content stream, the gateway 406 may pull data packets from the buffer 410 and transmit the packets to the receiver 408. Further, the buffer 410 of the gateway 406 may be of sufficient size to allow the gateway 406 time to identify missing data packets 414, request and receive re-transmission of the missing data packets 416 from the source gateway, and store the missing data packets in the buffer before transmission to the receiver 408 such that the content stream 404 transmitted to the receiver 408 may be in sequence when transmitted from the gateway 406. In this manner, the content stream 404 from the gateway 406 to the receiver 408 may be transmitted as a complete sequence of data packets. The receiver 408, and other devices within the transmission path of the content stream from the source device to a consuming device, may also include a similar buffer 412 and method of buffering to maintain the integrity of the content stream through the transmission process. However, each time the content stream is buffered at a device, a delay or lag is added to the transmission of the content stream.

The buffering scheme illustrated in FIG. 4A may be utilized for network environments 100 similar to that FIG. 1 in which gateways or other receiving devices receive a dedicated content stream from the source gateway or source device. As devices in this environment receive all of the data packets from a single source, missing packets are requested for re-transmission from the single source device. For alternate environments 200, such as that of FIG. 2 in which gateways or receiving devices receive more than one stream of the content data packets, a hitless merge technique may be used to fill in missing portions of a buffer. In particular, FIG. 4B illustrates hitless filling of a content buffer 430 at a gateway device 426 to provide streamed data packets to a receiving device 428. Similar to above, the gateway 426 of FIG. 4B may receive a content stream A 422 that includes data packets of the content and in which data packet 3 and data packet 5 may be missing. Therefore, the buffer 430 of the gateway 426 may include missing spaces in the stored sequence for data packet 3 and data packet 5. However, in the example of FIG. 4B, the gateway 426 also receives a second content stream B 420 from a second source, such as another gateway associated with the network 102. Content stream B 420 may include the same data packets as content stream A 422, only from a different transmitting device. As such, content stream B 420 may traverse a transmission path through the network 202 that is different than the transmission path taken by content stream A 422 such that failures within the network may affect the transmission path of content stream A 422 and not the transmission path of content stream B 420. Content stream B 420 may therefore include one or more of the missing data packets, including data packet 3 436 and data packet 5 438 of the content stream. The gateway 426 may identify the missing data packets from content stream A 422 in content stream B 420 and use the data packets from content stream B to fill in the missing data packets in buffer 430. This technique may be referred to as a hitless merge of the two content streams 420, 422. It should be appreciated that additional content streams may also be received at the gateway 426 and used to fill in the buffer 430 of missing data packets at a faster rate than the technique illustrated in FIG. 4A. However, in some instances, a missing data packet may be missing from all content streams received at the gateway 426 such that the buffer 430 may still be appropriately sized to provide enough delay for the gateway to request re-transmission of one or more missing data packets. Notably, the hitless merge technique removes the need for the gateway 426 to re-request missing data packets from stream A 422, reducing the time consumed to fill the buffer 430. Rather, because the gateway 426 may fill in the missing packets from second stream B 420 and does not need to wait for retransmission of the missing packets in stream A 422.

Despite the improvement in transmission speed gained from the hitless merge technique, buffer 430 of gateway 426 may nonetheless introduce a delay in the transmission of data packets to the receiving device 428 as described above. Similarly, each device or hop along the transmission path through the network 202 may introduce a similar lag to the transmission speed for providing the content stream to the consuming or destination device. Thus, returning to the method 300 of FIG. 3, the gateway 216 may determine if a received data packet is missing from the local buffer of the gateway. For example, gateway 426 of FIG. 4B may receive data packet 1 from content stream B 420 at some time after receiving data packet 1 from content stream A 422. As the data packet has been previously received and is included in buffer 430 or array, the gateway 426 may discard the data packet. However, in circumstances in which the data packet has not been previously received, the gateway 216 may store the sequence number of the received data packet in the array of sequence identifiers of the received data packets, prior to storing the entirety of the data packet in the buffer of the gateway 216. Thus, the sequence array may store identifiers of data packets for a particular content stream received at a device while a separate buffer 430 of the device may be utilized to store the content of the data packet. As the sequence identifier is typically significantly smaller in size than the data packet, the time used to store the sequence identifier is less than the time used to store the data packet in the buffer. Thus, in operation 310, the gateway 216 may store the sequence identifier of the received data packet in the array of received data packets prior to storing the contents of the data packet in the buffer 430.

Upon storing the sequence identifier in the array, the gateway 216 may forward the data packet to one or more receiving devices requesting the content stream from the gateway, such as receivers 224-228. In this technique, the forwarding of the data packet to the receiving devices may occur prior to storage of the received data packet in the buffer 430 maintained by the gateway 216. In other words, the gateway 216 may provide received data packets downstream regardless of missing data packets within the content stream. This is different than previous techniques in which each data packet is buffered before transmission downstream to give devices time to request missing packets or receive missing packets from a second content stream. By transmitting received packets downstream prior to buffering at each device along the transmission path, the content packets may be transmitted without the delay or lag introduced to buffer the content stream at each hop.

For example, the system of FIG. 4B may transmit received data packets prior to buffering at the gateway 426. In particular, gateway 426 may receive data packet 1, data packet 2, data packet 4, and data packet 6 from content stream A 422 (transmitted from a first source gateway). Prior to buffering, the gateway 426 may store sequence identifier 1, 2, 4, and 6 in an array of received data packets and forward those data packets to receiver 428 via content stream 434. The receiver 428 may, in one instance, store the received data packets in a traditional buffer 432 based on the sequence identifier of each data packet. In another instance, the receiver 428 may also store the sequence identifiers in an array and forward the data packets to another requesting device prior to storing the buffer 432. At a later time, gateway 426 may receive stream B 420 from a different source gateway. Prior to buffering, gateway 426 may determine that data packet 1 and data packet 2 were previously received from data stream A 422 based on the inclusion of sequence identifiers of those data packets in the array. Given this circumstance, the gateway 426 may discard data packet 1 and data packet 2. However, the gateway 426 may receive data packet 3 and data packet 5 from content stream B 420 and, based on the array missing the corresponding sequence identifiers, may determine that data packet 3 and data packet 5 have not been previously received. The gateway 426 may then store a sequence identifier for data packet 3 and data packet 5 in the array and forward those data packets to receiver 428, regardless of the location in the sequence of the content stream 434 from the gateway 426 to the receiver 428. For example and as shown in FIG. 4B, the content stream may include data packet 4, followed by data packet 6, followed by data packet 3, followed by data packet 5. The gateway 426 may forward data packet 3 and data packet 5 prior to buffering the data packets in buffer 430. The receiver 428 may receive data packet 3 440 and data packet 5 442 and store in a buffer 432 or forward to the next device in the transmission path in a manner similar as the gateway 426. In this manner, a delay to buffer the content stream at the gateway 426 may be skipped or bypassed to provide the content stream data packets to the receiving device 428 at a faster rate.

Returning again to the method 300 of FIG. 3, the gateway 216 may maintain a buffer of the received data packets of the content stream for use in filling missing packet requests and/or providing the content stream to one or more requesting devices. Thus, in operation 314, the gateway may store the received data packet in a buffer at a location in the buffer associated with the sequence number of the received packet. In one particular instance, however, storing of the data packet in the buffer may occur after the data packet is transmitted or forwarded downstream to requesting devices. Thus, the data packet may be transmitted without incurring the delay associated with storing the packet in the buffer or requesting missing packets from a transmitted device, although the gateway 216 may include a buffer of data packets of the content stream for providing to requesting devices. Following storage of the data packet in the buffer, the gateway 216 may return to operation 304 to receive additional data packets from one or more streams of data packets associated with a content. Thus, through the operations of the method 300 of FIG. 3, one or more devices in the transmission path of a content stream may provide data packets downstream prior to buffering of the data packets to reduce the delay or lag in transmitting the content stream.

Figure 5A:
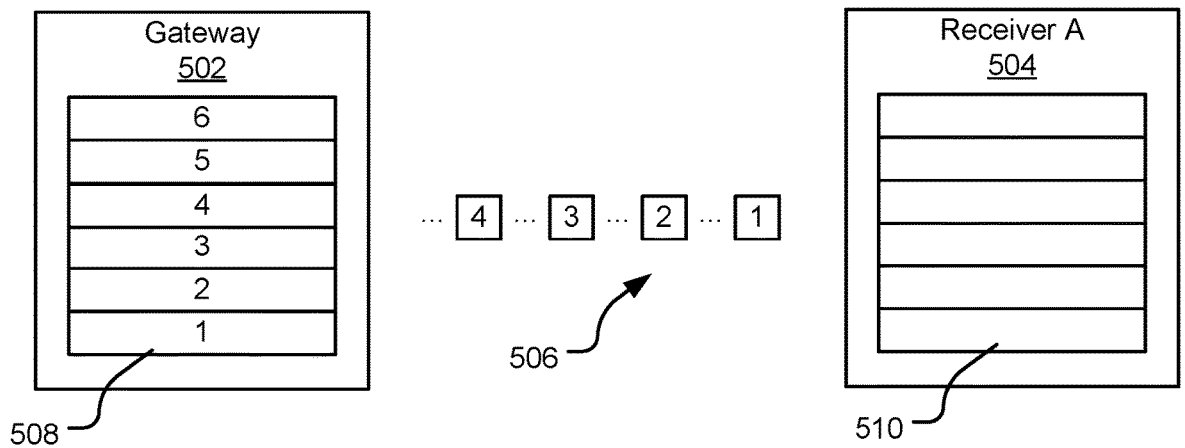
FIG. 5A is a schematic diagram illustrating streaming of data content from a gateway device to one receiving device in accordance with one embodiment.
Figure 5B:
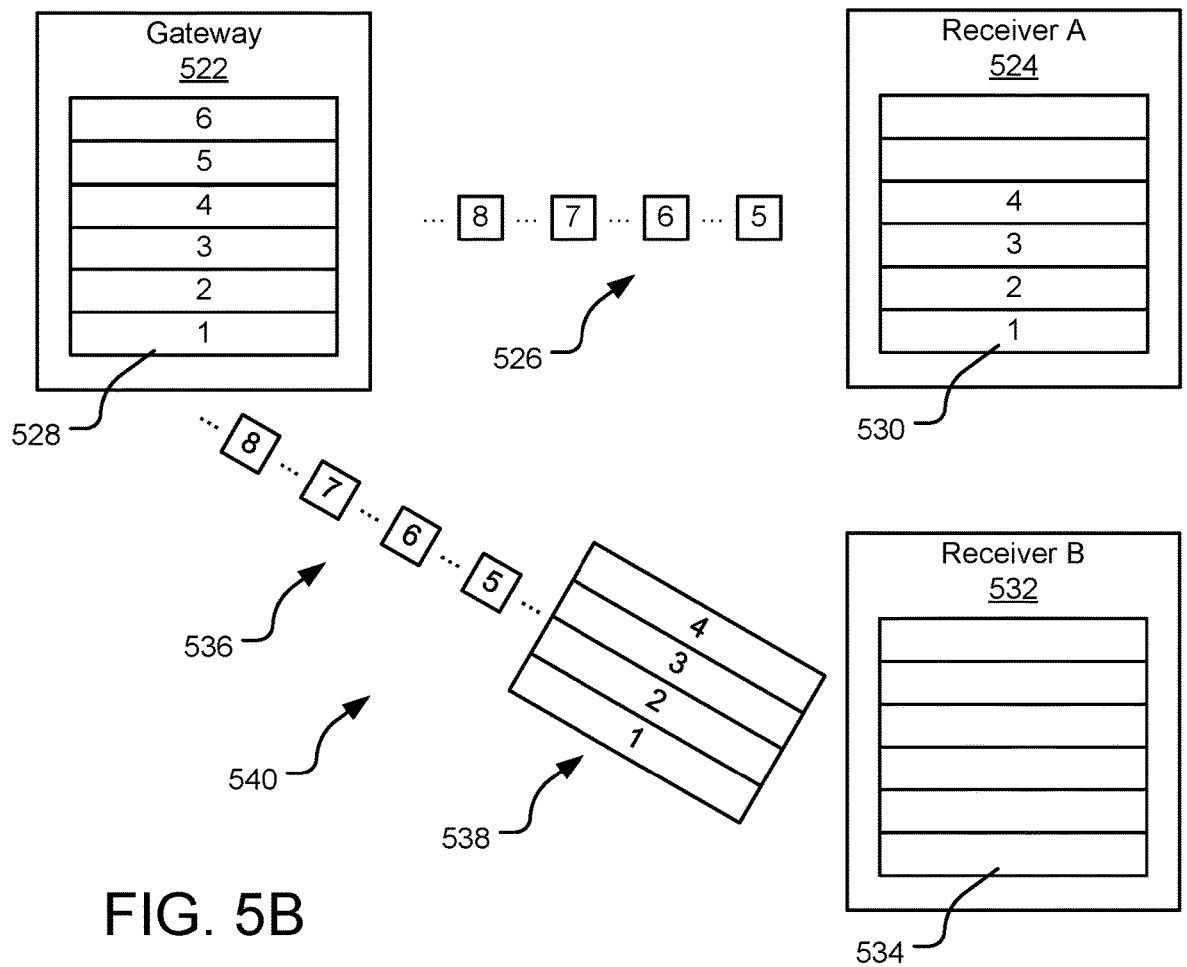
FIG. 5B is a schematic diagram illustrating streaming of data content from a gateway device to two or more receiving devices in accordance with one embodiment.

Additional techniques may be used to increase the speed (or alternately decrease the lag or delay) in providing a content stream to a receiving device. In particular, FIGS. 5A and 5B illustrate streaming of data content from a gateway device to one or more receiving devices in accordance with one embodiment. In particular, FIG. 5A illustrates streaming content from a gateway 502 to a receiving device 504 similar to that described above. In particular, gateway 502 may include a buffer 508 of data packets of a content stream for providing the content stream 506 to a receiver 504. As described above, the gateway 502 may provide packets of the content stream 506 either prior to or after buffering the data packets. FIG. 5A illustrates a beginning phase of streaming the content to the receiving device 504 in which the receiver has not received the data packets of the stream 506 and the receiving device buffer 510 is empty. However, receiver A 524 may begin filling the buffer upon receipt of the data packets have received data packets. As shown in the upper portion of FIG. 5B, the receiver 524 may fill the local buffer 530 with data packets 1-4 from gateway 522. In addition, gateway 522 may continue to stream the content to the receiver 524 by providing additional data packets 5-8 in data stream 526 from the buffer 528 of the gateway 522.

During the transmission of the content stream, the gateway 522 may receive a request from a second receiver, in this case receiver B 532, to join the content stream and begin receiving the data packets of the stream. The request may be based on a request from a consuming device to receive the content stream or as an overflow device for receiver A 524. In response, the gateway 522 may begin providing the content stream 540 to the requesting device 532 by transmitting at least a portion 538 of the buffer 528 to the receiver 532 that is more than a single data packets of the stream. The receiver 532 may use the buffer portion 538 to fill a local buffer 534 such that the local buffer 534 at the receiver 532 may be filled faster than through a traditional stream of data packets. For example, gateway 522 may transmit portion 538 of buffer 528 that includes data packets 1-4 in one transmission to receiver B 532, rather than transmitting each data packet separately. In one instance, the data included or size of the buffer portion 538 may be based on an available bandwidth of a connection between the gateway 522 and the receiver 532. For example, if the available bandwidth between the gateway 522 and the receiver 532 supports transmitting all of the data packets stored in the buffer 528, the gateway 522 may transmit the entirety of the buffer 528 as a single transmission. For smaller bandwidths, a portion of the buffer 528 may be transmitted to the receiver 532. As such, the gateway 522 may store or otherwise obtain an estimated available bandwidth for a connection between the gateway and the receiver device 532. In the example shown, the first four data packets 538 stored in the buffer 528 of the gateway 522 may be provided as a single transmission to receiver B 532 to begin the requested content stream 540 to the receiver. Following the initial download of the buffer portion 538, the gateway 522 may then begin providing data packets 536 in a traditional stream of data packets, as above. However, by initially providing the buffer portion 538 to the receiver 532, the buffer 534 of the receiver 532 may be filled quicker so that the receiver may provide the content stream to other downstream devices faster (as the receiver 532 may wait until the buffer 534 is filled before providing data packets to a downstream device). In this manner, the gateway 522 may take advantage of a large bandwidth connection between the gateway and the receiver 532 to speed up providing the content stream to a downstream device, such as a consuming device.

Figure 6:
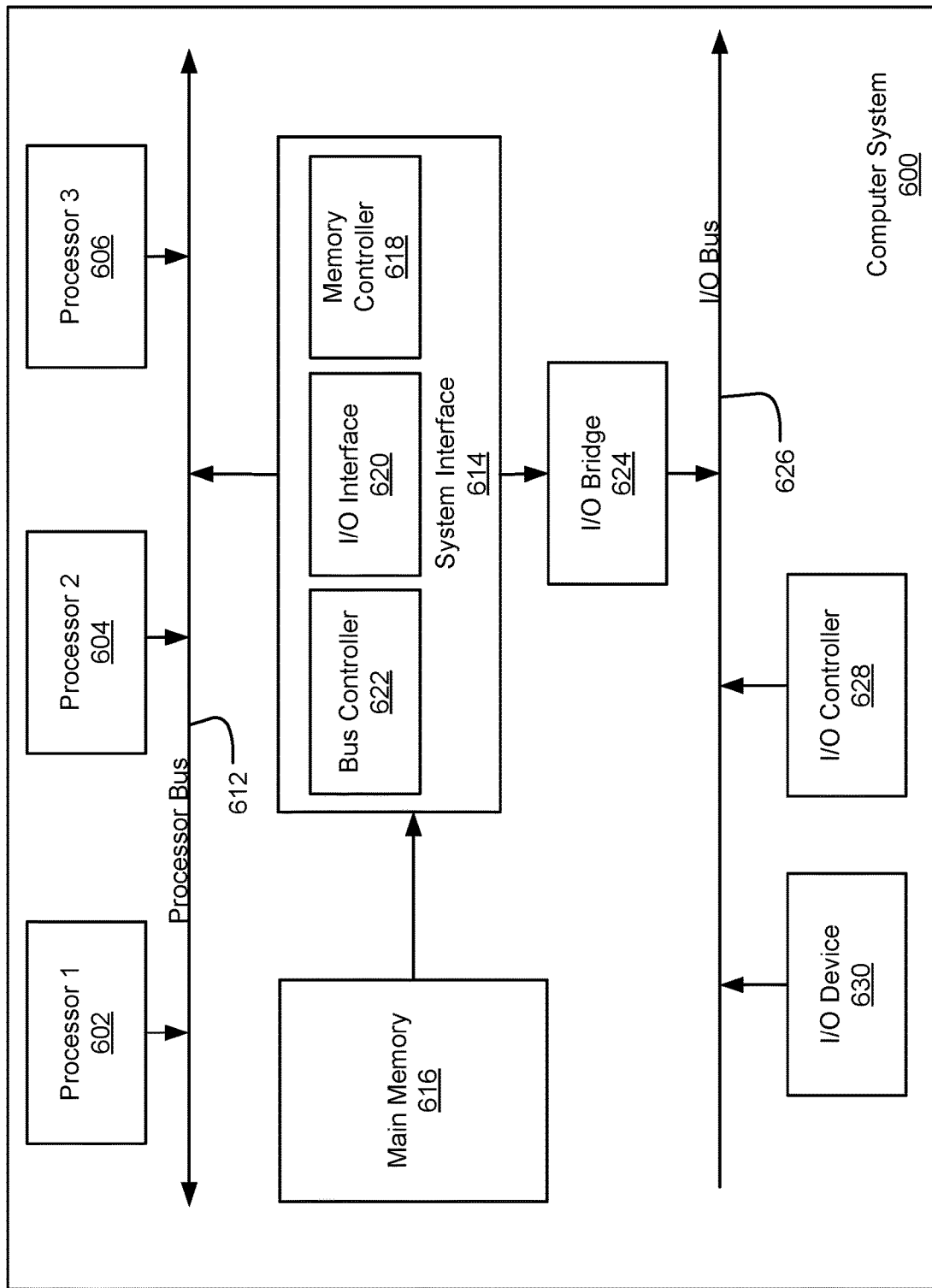
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may be the gateway 216 or any other device in the transmission path of the content stream discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

What is claimed is:

1. A method for processing data packets of a content stream, the method comprising,
   receiving, from a source device, a portion of a content stream comprising at least one data packet;
   comparing, at a network device, a sequence identifier obtained from the at least one data packet to a storage array comprising sequence identifiers of data packets received at the network device; and
   forwarding, prior to storing the received data packet in a buffer maintained by the network device and based on the sequence identifier of the received data packet missing from the storage array, the received data packet to a computing device.

2. The method of claim 1, further comprising storing the received data packet in the buffer maintained by the network device after forwarding the received data packet to the computing device.

3. The method of claim 2, wherein storing the received data packet comprises:
   identifying, based on the sequence identifier of the received data packet, a location within an order of a sequence of data packets; and
   inserting, based on the identified location, the received data packet in the buffer.

4. The method of claim 1, further comprising:
   receiving, at the network device and from a receiving device, a request for the content stream; and
   transmitting, to the receiving device, a portion of the buffer, the portion comprising a plurality of data packets of an ordered sequence of data packets including the at least one data packet.

5. The method of claim 4, wherein a size of the portion of the buffer is based on a bandwidth of a connection between the network device and the second receiving device.

6. The method of claim 1, further comprising:
   receiving, from a second source device, a second portion of the content stream; and
   if a sequence identifier associated with a data packet of the second portion of the content stream is missing from the storage array, forwarding the data packet of the second portion to the computing device prior to storing the data packet of the second portion in the buffer.

7. The method of claim 6, wherein the sequence identifier of the data packet of the second portion is less than the sequence identifier obtained from the received data packet of the at least one data packet.

* * * * *